United States Patent [19]

Kanai et al.

[11] Patent Number: 5,087,504
[45] Date of Patent: Feb. 11, 1992

[54] MULTI-INJECTION MOLDED FLANGE WITH GASKET IN WEDGE SHAPED OPENING

[75] Inventors: Toshiyuki Kanai; Nobuo Shinnoh, both of Hanishina, Japan

[73] Assignee: Nissei Jushi Kogyo Kabushiki Kaisha, Nagano, Japan

[21] Appl. No.: 523,887

[22] Filed: May 16, 1990

Related U.S. Application Data

[63] Continuation of Ser. No. 347,908, May 5, 1989, abandoned.

[30] Foreign Application Priority Data

May 11, 1988 [JP] Japan .................. 63-114453

[51] Int. Cl.$^5$ .................. B32B 3/30; F16L 23/16
[52] U.S. Cl. .................. 428/167; 285/349; 285/352; 285/910; 285/336; 285/350; 428/64; 428/57; 428/139; 428/157; 428/161; 428/163; 428/172; 428/192; 428/477.7; 428/451
[58] Field of Search .......... 285/349, 352, 910, 336, 285/350; 428/64, 167, 57, 139, 157, 161, 163, 172, 192, 477.7, 451

[56] References Cited

U.S. PATENT DOCUMENTS

| | | | |
|---|---|---|---|
| 986,439 | 3/1911 | Camp | 285/349 |
| 1,912,255 | 5/1933 | Clark | 428/122 X |
| 2,086,133 | 7/1935 | Kennedy | 285/910 X |
| 2,609,570 | 9/1952 | Danielson et al. | 264/274 |
| 3,599,169 | 8/1971 | Detch | 439/383 |
| 3,747,963 | 7/1973 | Shivak | 285/336 |
| 4,228,575 | 10/1980 | Wiltshire et al. | 29/415 X |
| 4,253,481 | 3/1981 | Sarlls, Jr. | 137/514.5 X |
| 4,314,655 | 2/1982 | Leibhard et al. | 285/50 X |
| 4,468,427 | 8/1984 | Degrassi et al. | 428/522 X |
| 4,563,374 | 1/1986 | Treber et al. | 428/167 |
| 4,588,213 | 5/1986 | Bollfrass et al. | 285/350 X |
| 4,703,518 | 10/1987 | Ausnit | 428/139 X |

FOREIGN PATENT DOCUMENTS 2528534 12/1983 France .................. 285/349

OTHER PUBLICATIONS

Japanese Provisional Publication Gazette 60-52322, "A Method of Molding a Multi-Molded Body".
Japanese Provisional Publication Gazette 63-104809, "A Method of Molding a Multi-Injection Molded Body".

*Primary Examiner*—Patrick J. Ryan
*Assistant Examiner*—William P. Watkins, III
*Attorney, Agent, or Firm*—Birch, Stewart, Kolasch & Birch

[57] ABSTRACT

In the present invention, when a multi-injection molded body made of at least a first and a second resins is molded, catching means are formed generally by pressing a part of the surface about an opening of a concave section formed in a first molded body made of the first resin to project interior side wall faces of the concave section inward, and injecting a second resin to mold a second molded body thus formed has catching means in the concave section, so that the second molded body is tightly fixed to the first molded body.

3 Claims, 14 Drawing Sheets

FIG. 4
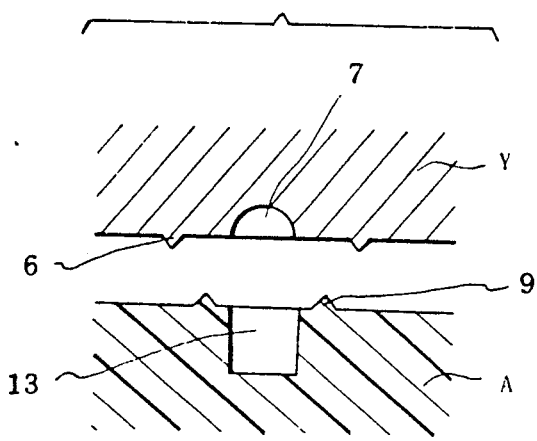
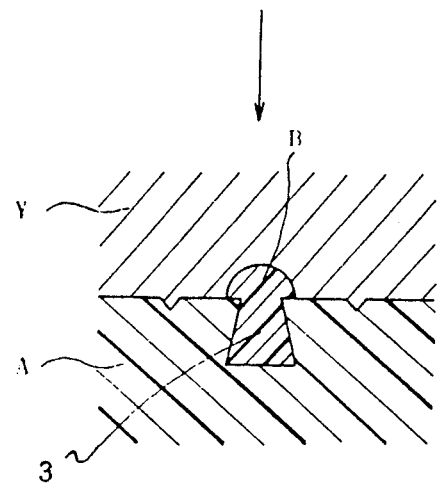
FIG. 5
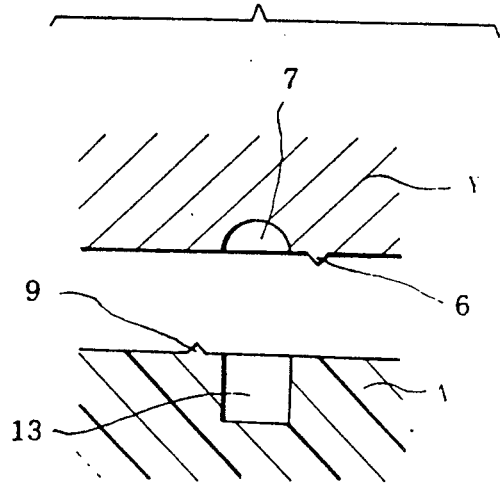
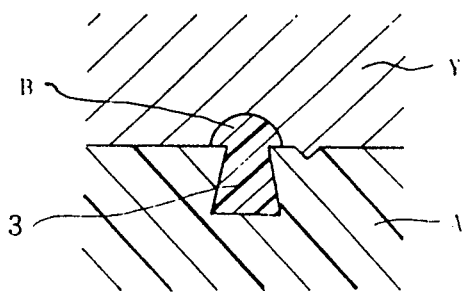

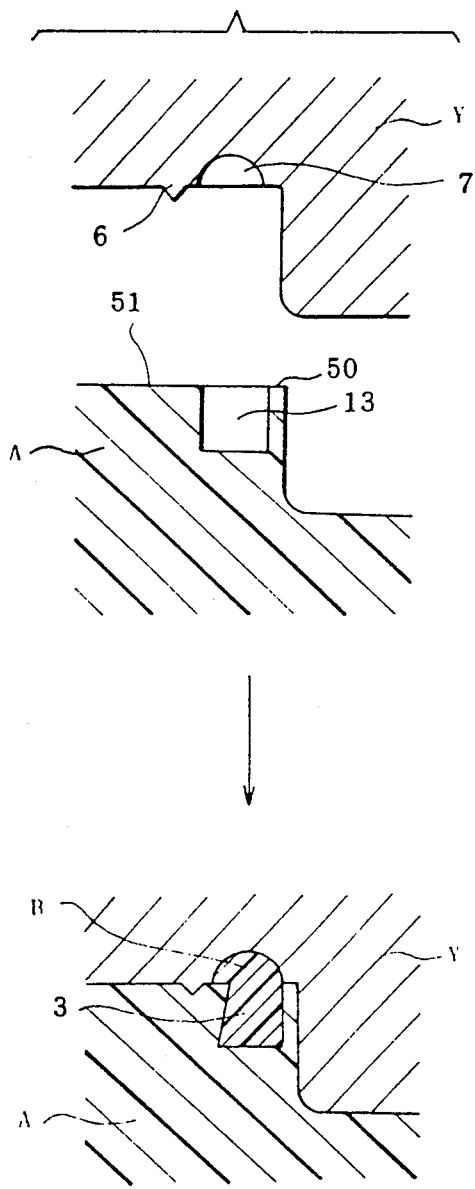
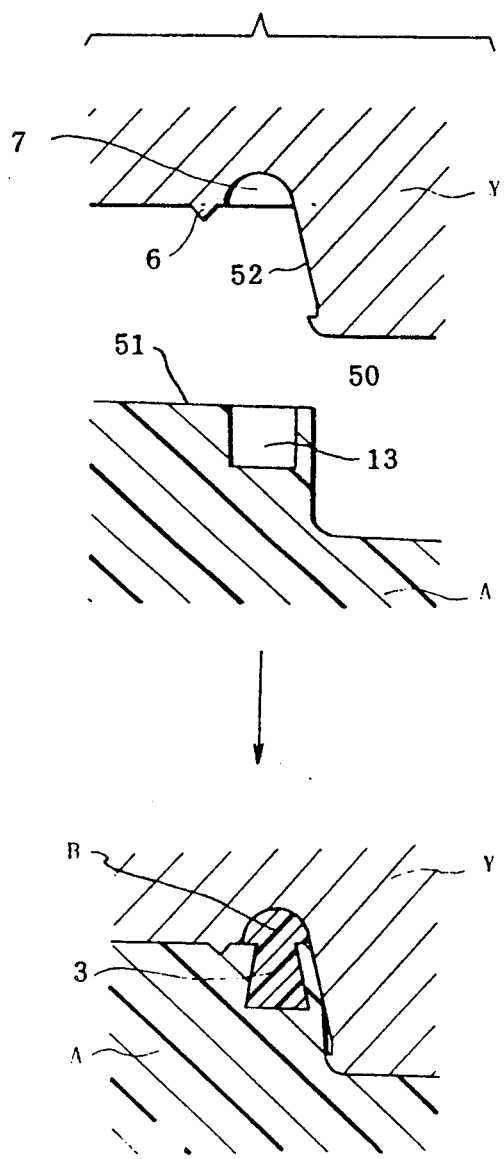

MULTI-INJECTION MOLDED FLANGE WITH GASKET IN WEDGE SHAPED OPENING

This application is a continuation of application Ser. No. 07/347,908, filed May 5, 1989 now abandoned.

FIELD OF THE INVENTION

The present invention relates to a multi-injection molded body, a method of molding for the same, and a multi-injection molding machine. More precisely it relates to a multi-injection molded body consisting of two or more kinds of resins, a method of molding for the same, and a multi-injection molding machine for the same.

BACKGROUND OF THE INVENTION

Recently, cars, home electric appliances, cameras, containers, etc. have been required to become lighter in weight. As such, parts in machines, appliances, etc. have been changed from metals to plastics.

Parts made of plastics consist of a plurality of molded bodies (described as first molded body or bodies in the following description), and sealing parts (described as second molded body or bodies in the following description). Sealing parts are made of such elastic polymers as silicon gum, urethane gum, styrene-butadiene gum, etc., and are used in assembling sections between parts made of plastics so as to provide sealing, absorbing or nonskid capabilities for products manufactured therewith.

Conventionally, the second molded bodies are independently molded from the first molded bodies, then they are manually assembled into the first molded bodies. In such a method, there are disadvantages of lower assembling precision and increasing assembling steps. To solve these disadvantages, there was disclosed a method of multi-injection molding in Japanese Provisional Publication (Kokai) Gazette 60-52322 and Japanese Provisional Publication (Kokai) Gazette 63-104809. The method comprises the steps of molding a first molded body having a concave section on the surface thereof by injection molding, and injecting elastic polymer for forming a second molded body in the concave section. In this conventional method, multi-injection molded bodies consisting of the first molded body and the second molded body are molded in one injection molding step, so that assembling precision can be increased, and assembling steps can be reduced.

In the above conventional method, first molded bodies are molded by injection molding, and the walls of concave sections are formed approximately vertical from the bottom faces thereof, in order that one can pick products out from molding machines easily. But in the above method, second molded bodies, molded in concave sections of first molded bodies, can also be pulled out of the first molded bodies easily because there are provided no catching means on the side wall faces of the concave sections. In order to fix second molded bodies in concave sections of first molded bodies, as disclosed in the gazett No. 63-104809, reactive elastomer layers, primer layers, etc. are formed between inner bottom faces of concave sections of first molded bodies and bottom faces of second molded bodies to adhere them.

OBJECT AND SUMMARY OF THE INVENTION

The object of present invention is to provide multi-injection molded bodies, which consist of a first and a second molded body molded by injection molding, and whose second molded bodies are tightly fixed in concave sections of said first molded bodies without adhering layers. A method of molding for the same; and a multi-injection molding machine for molding the same are also provided.

We have found that catching (or holding) means can be formed on the side wall faces of the concave sections of the first molded body by the steps of forming an undercut section, by pressing upon the rim, or interior walls to the concave section, to project the rim area of the side walls towards the inside of the concave section, and then injecting a resin melt for forming the second molded body into the concave section of the first molded body, so that the second molded body can be tightly fixed to the first molded body.

The present invention provides that, in a multi-injection molded body formed by at least two kinds of resin such as a first resin and a second resin, and comprising a first molded body A made of the first resin, and a second molded body B made of the second resin, and the multi-injection molded body being characterized in that at least a part of a concave section 3, which is formed on a joint face of the first molded body A joining the second molded body B, is projected toward the inside of said concave section 3 to form an undercut section, and the second resin is filled in the concave section 3 forming a part of the second molded body B.

The present invention further provides a multi-injection molding method to mold a multi-injection molded body formed by at least two kinds of resin, such as a first resin, and a second resin and comprising a first molded body A made of the first resin and a second molded body B made of the second resin characterized in that molding the first molded body A has a concave section 13 on the joint face thereof joining to the second molded body B, an undercut section is formed by pressing at least a part of the rim of the concave section 13 to project the walls of the concave section 13 toward the inside thereof to form an undercut section 5, then the section resin melt is injected into the concave section 3 and a cavity 7 of a mold Y or Y'.

And the present invention further more provides an injection molding machine for a multi-injection molded body formed by at least two kinds of resin, such as a first resin and a second resin, and comprising a first molded body A made of the first resin, and a second molded body B made of the second resin and being characterized in that a pair of first molds Z and W for molding the first molded body A have a concave section 13 on the joint face thereof joining to the second molded body B, and a second mold Y has a pressing section for pressing at least a part of the area about the rim of the concave section 13 of the first molded body A to project the side walls of the concave section 13 toward the inside thereof to form an undercut section 5, a pair of third molds Y or Y' and Z for injecting the second resin melt in a cavity 7, which accommodates the first molded body A and which molds the second molded body B, including the concave section 3 of the first molded body A.

The method of the present invention, further provides for forming the undercut section 5 in the concave section 3 of the first molded body A. Such can be easily achieved pressing the area about the rim of the concave section 13 of body A with projected sections 6 of a second mold Y, or by pressing a projected section 9 previously formed in the vicinity of the concave section 13, or by pressing at least a part of walls exterior to the concave section 13. Additionally, if injection of the second resin melt for molding the second molded body B is executed with presssing all parts of the rims of the concave section 3, flashes easily formed in the vicinity of the second molded body B are effectively prevented even in cases where the second resin is a material with small surface tension, such as silicon gum, etc.

In the injection molding machine of the present invention, if the pressing sections of the mold Y are formed as projecting sections 6, or are capable of pressing at least a part of exterior walls to the concave section 13, the undercut section 5 can be easily formed in the concave section 3. For example, even in a pair of first molds Z and W (FIG. 7a) for molding the first molded body A, cavities to mold have projecting sections 9 in the vicinity of the concave section 13. If the projecting sections 9 of the first molded body A are pressed, the undercut sections 5 can be easily formed in the concave section 13. In such a case, it is prefer to have one of a pair of molds Z and W, in which the first molded body A is left when the molds are opened, and then making common use of the mold Z by combining with a second Y (FIG. 7b) having a pressing section to form the undercut section 5 in the concave section 3 of the first molded body A, or to a mold, which accomodates the first molded body A, and wherein a pair of molds forms the second molded body B. It is also, especially preferred that the pressing sections for pressing all parts of rim of the concave section 13 are provided, such as in the mold Y or Y' (FIG. 16) into which the second resin for molding the first molded body A is injected, since they are capable of pressing all parts of the rim of the concave section 3 while injecting the second resin into the concave section thereof, so that flashes easily formed during molding the second molded body B are effectively prevented.

The present invention is especially preferred in cases wherein the two resins are noncompatible, and wherein the second resin is an elastic polymer for providing sealing, absorbing, or nonskid properties, etc. to the article produced.

Note that, the word "undercut section" as applied to concave section 3 means at least a part whose width of space is narrower than the width of the bottom face of the concave section 3.

In the present invention, the undercut section 5 may be formed in the concave section 3 by pressing about the surface of rim area of the concave section opening of the first molded body A to form a catching means for catching the second molded body B, then the second resin for molding the second molded body B is injected into the concave section 3, so that the second molded body B is tightly fixed in the concave section 3 of the first molded body A. Alternatively the undercut section 5 of the concave section 3 of the first molded body A, may be easily formed by clamping a third mold Z, accommodating the first molded body A, and a second mold Y having a pressing section for pressing in the vicinity of the opening of the concave section 13 of the first molded body A.

BRIEF DESCRIPTION OF THE DRAWINGS

Embodiments of the invention will now be described by way of example and with reference to the accompanying drawings, in which:

FIGS. 2-4 show explanation views which explain a method of molding multi-injection molded bodies of the present invention;

FIGS. 9-16 show explanation views of certain other embodiments of the present invention.

DETAILED DESCRIPTION OF PREFERRED EMBODIMENTS

The present invention will now be explained with reference to drawings.

Figure 1A:
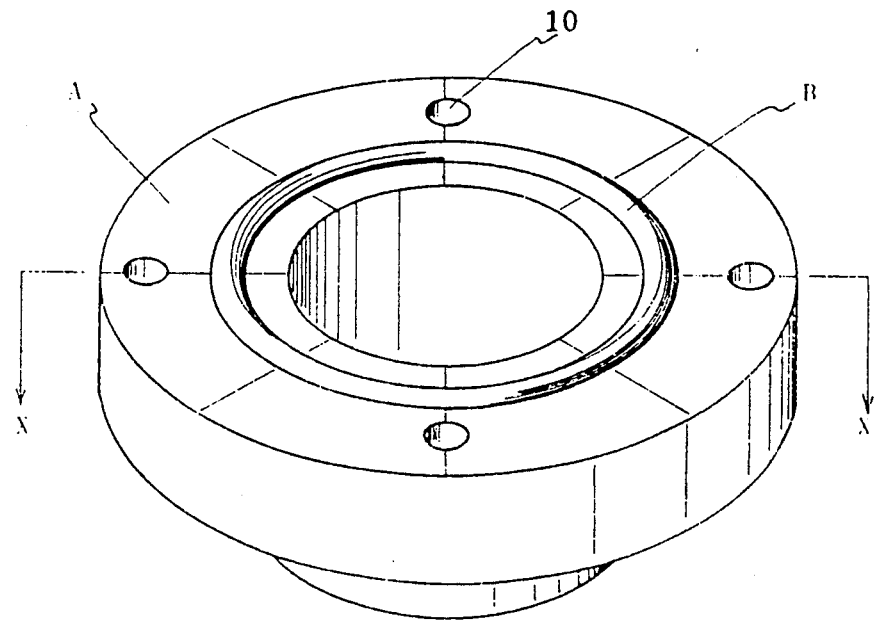
FIG. 1 shows a perspective view and a sectional view of an embodiment of a multi-injection molded body of the present invention.
Figure 1B:
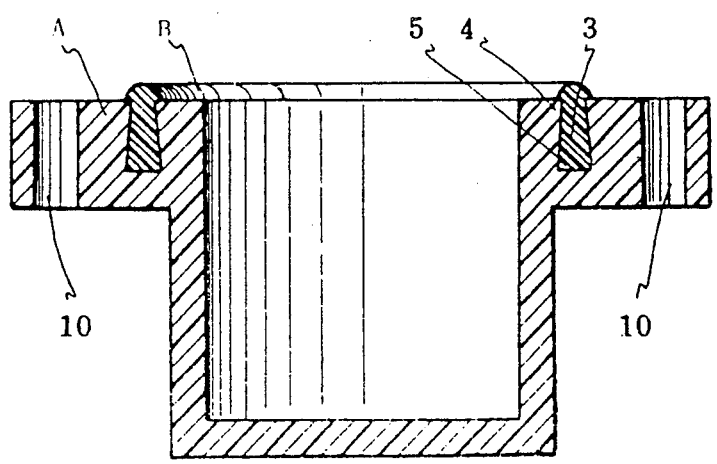

FIG. 1(a) shows a perspective view of an example of the multi-injection molded bodies of the present invention, and FIG. 1(b) shows a sectional view of the multi-injection molded body of FIG. 1 taken along the line X—X of FIG. 1(a).

In FIG. 1, in a flange section of a first molded body A which is made of a first resin (e.g. nylon-6 including glass fiber), a seal ring as a second molded body B made of a second resin (e.g. silicon gum) is provided and a plurality of through-holes 10 are bored therein.

There is formed a concave section 3 on the joint face of the first molded body A joining to the second molded body B. The upper section of the walls of the concave section 3 is narrower than the lower section thereof, so the sectional shape of the concave section 3, as shown in FIG. 1(b), is a so called "inverted-tapered shape" wherein the width of the opening 4 of the concave section 3 is about the narrowest; and wherein the width of the bottom section of the concave section 3 is about the widest. Therefore, the section 5 is formed as the undercut section. In the concave section 3, silicon gum as the second resin is filled therein, and the second resin forms a part of the second molded body B. Therefore, a part of the second molded body is attached in the concave section 3 having the undercut section in the bottom section 5, so the projected section of the opening 4 of the concave section 3 is formed as catching means to catch the second molded body B, so that the second molded body B is tightly fixed in the concave section 3 by the undercut section.

Figure 2A:
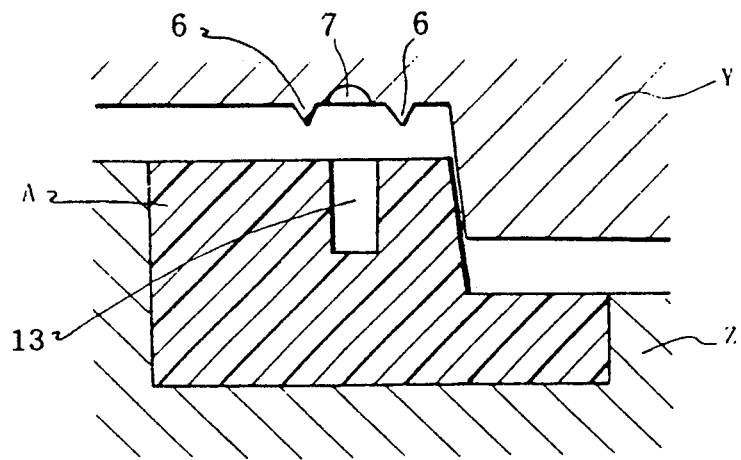
Figure 2B:
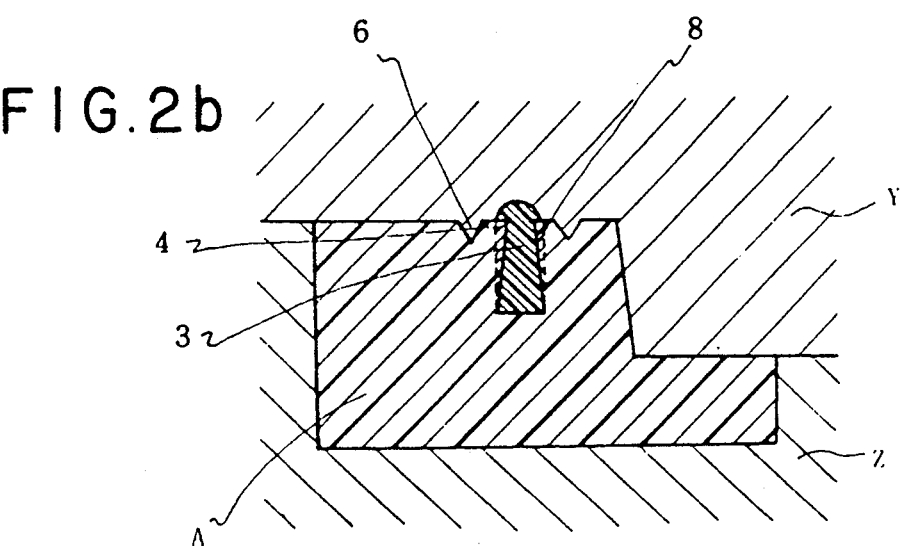
Figure 2C:
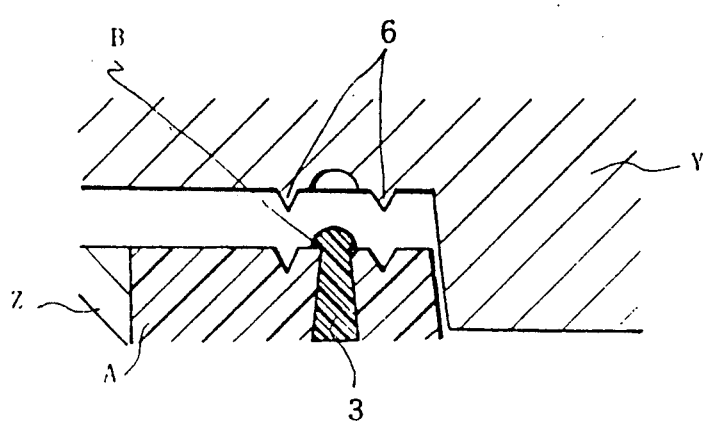

The multi-injection molded body A is molded by the method shown in FIG. 2.

Namely, first, the first molded body A having the concave section 13 is left in a mold Z of a pair of molds for molding the first molded body A [see FIG. 2(a)]. The concave section 13 of the first molded body A is opened on the upper face thereof. The sectional shape of the concave section 13 is, as shown in FIG. 2(a), a rectangle and its side walls are formed approximately vertical to the inner bottom face of the concave section 13, so that another mold, which molds the first molded body A with the mold Z, can easily leave from the first molded body A during mold opening, so that then the first molded body A can be left in the mold Z.

Next, a surface area about the rims of the first molded body A is pressed by clamping a mold Y, which has projecting sections 6 and a cavity 7 for molding the second molded body, and the mold Z in which the first molded body A has been left therein [FIG. 2(a), (b)].

Both side walls of the concave section 13 are projected inward. The length of the projection is, as shown by numeral 8 in FIG. 2(b), that the width of the upper section is longer than the width of the lower section, so that sectional view of the concave section transforms into an inverted-tapered shape. In such a way an undercut section is formed in the vicinity of the bottom section 5 of the transformed concave section 3, so that a catching (or holding) means is formed at opening 4 of the concave section 3.

Next, the second resin is injected into the concave section 3 and the cavity 7 of the mold Y, and then the molds Y and Z are opened to obtain a multi-injection molded body consisting of the first molded body A and the second molded body B which is tightly fixed to molded body A by the concave section 3 [FIG. 2(b), (c)].

Appropriate second resins for molding the second molded body B may have a low surface tension, e.g. silicone gum.

There is also a disadvantage that, however, when the second resin has low suface tension, since they can enter quite narrow gaps (e.g. 5μ), thereby easily forming flashes around the second molded body B.

In this embodiment, sealing ability around the concave section 3 can be greatly increased by pressing all parts of the rim of the concave section of the first molded body A with the projecting sections 6 of the mold Y during injecting the second resin into the concave section 3 and the cavity 7, so that forming flashes around the second molded body B can be prevented.

Figure 3A:
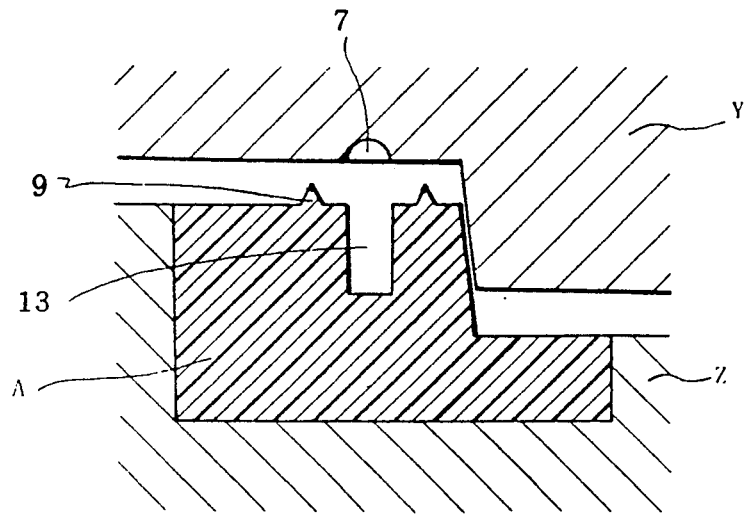
Figure 3B:
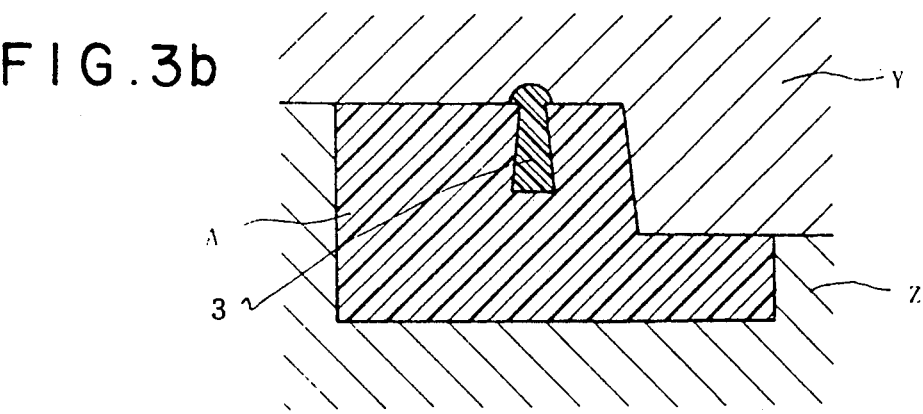
Figure 3C:
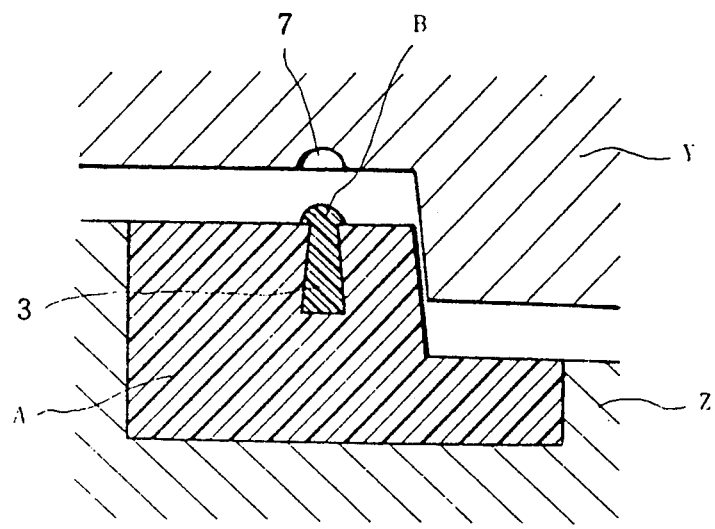

The undercut section can be formed by another method, as shown in FIG. 3.

First, projecting sections 9 are previously formed in the vicinity of the opening of concave section 13 [FIG. 3(a)]. The concave sections 9 are pressed by the bottom face of a mold Y having a cavity 7 for molding the second molded body [FIG. 3(a), (b)]. In this method, the pressed mark on the upper face of the first molded body A can be smaller than the method of pressing by the projecting sections 6 of the mold Y shown in FIG. 2 [FIG. 3(b), (c)].

The methods shown in FIGS. 2 and 3 can be combined. This embodiment is shown in FIGS. 4 and 5.

FIG. 4 shows the method of doubly pressing the rim of the opening of concave section 13 of the first molded body A and the projecting sections 9, which is previously formed in the vicinity of the opening of the concave section 13. While, FIG. 5 shows the method of pressing each side of the opening of the concave section 13. In the above stated methods, the projecting length of the wall of the concave section 13 of the method shown in FIG. 5 can be the longest among them. Note that, in above stated embodiments, the sectional shape of the concave section 13 has been a rectangle, but the same is not necessary if the mold, which molds the first molded body A, can be easily removed from the first molded body A, and thus the sectional shape of the concave section 13 may be drawable-tapered shape, half circle, half ellipse, etc.

Additionally, the sectional shape of the projecting section 6 of the mold Y may be wedge shape, half circle, half ellipse, trapozoid, etc. The projecting section 6 and/or 9 may be provided around the rim of the concave section 13 of the first molded body A to press all of the rim, but also may be provided to only press a part of the rim of the concave section 13. Either way, the projections are required to press in the vicinity of the opening of the concave section of the first molded body A to project the walls of the concave section inward. If the mold Y can tightly contact the first molded body A, which is left in the mold Z, except for the concave section, the walls of the concave section can be easily projected inward during clamping the molds Y and Z so as to press the rim of the concave section 13 of the first molded body A, and thus form an undercut section. The mold Y, as shown in FIG. 6, may have an injection hole 11, through which the second resin for molding the second molded body B is injected in the cavity 7. Note that, the injection hole 11 may be provided in a mold apart from the mold Y.

FIG. 6 shows a multi-injection molding machine for molding the multi-injection molded bodies of the present invention.

The injection molding machine shown in FIG. 6 has a first injection device 20 and a second injection device 21 on a base 30. Molds W, Y and Z are provided between a movable board 24 and a fixed board 22. The mold Z is fixed with bolts on the movable board 24 which is moved by a clamping piston 26 slidably attached in a clamping cylinder 27. The mold Z can be closed, clamped or opened with the mold W or Y which are fixed with bolts on a slide board 25. The slide board 25 is slid by an oil cylinder 23 which is provided on the fixed board 22. The board can slide between the position where the mold Z is closed or clamped with the mold W, and the position where the mold Z is closed or clamped with the mold Y.

In the injection molding machine shown in FIG. 6, after the molds Z and W were clamped by moving the movable board 24 toward the right with the movement of the clamping piston 26, the first injection device 20 advances, and nylon-6 melt including glass fiber is injected into a cavity, which is formed by the molds Z and W, for molding the first molded body.

Pellets of nylon-6 including glass fiber, which are provided through a hopper 29 mounted on the first injection device 20, are melt in the first injection device 20.

After solidification of the injected nylon-6 and moving back of the first injection device 20, the movable board 24 is moved to the left to open the molds Z and W. During mold opening, the concave section 13 of the first molded body A opens on the upper face thereof, and the first molded body A is left in the mold Z.

Figure 6A:
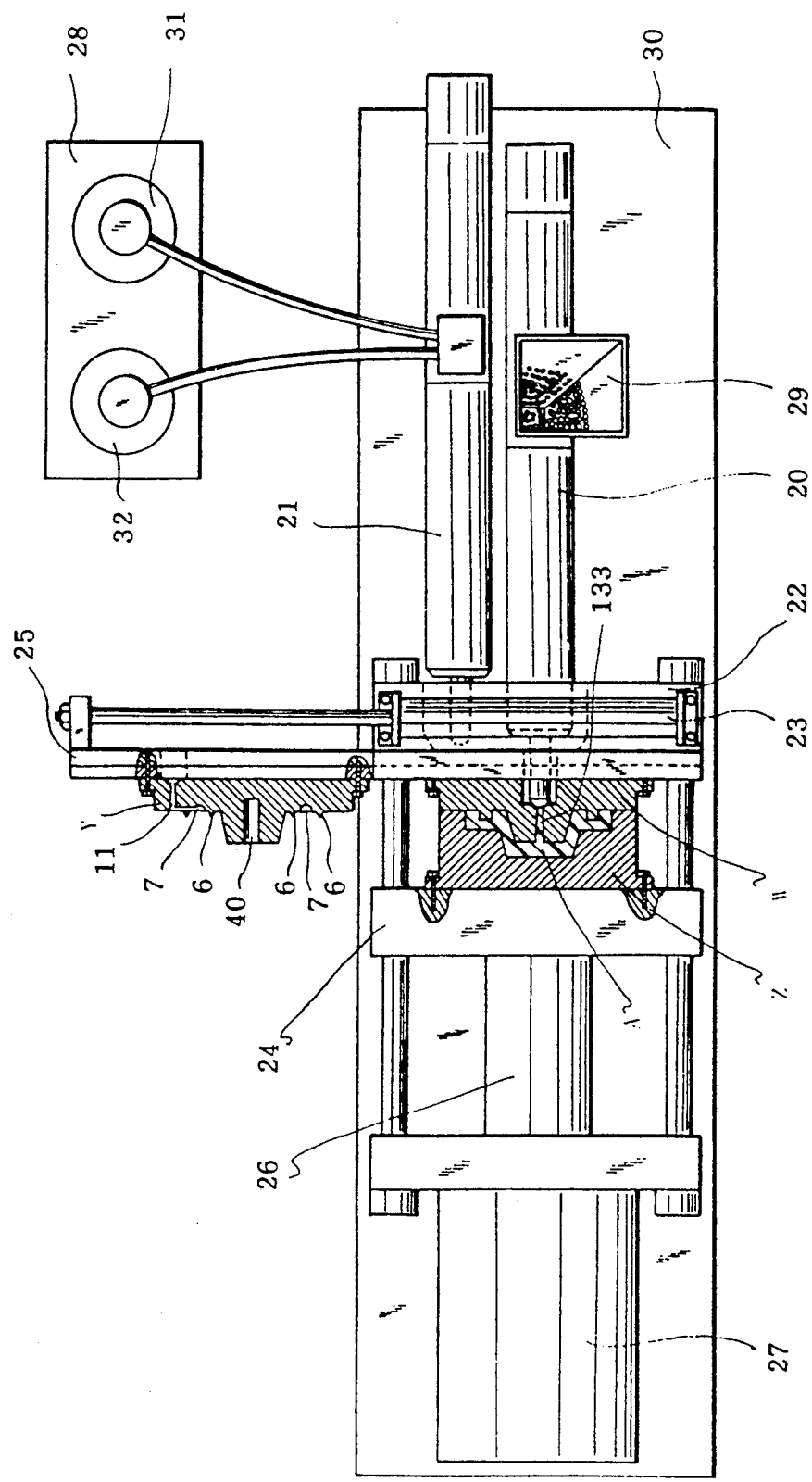
FIGS. 6-8 show explanation views which explain a multi-injection molding machine of the present invention.
Figure 6B:
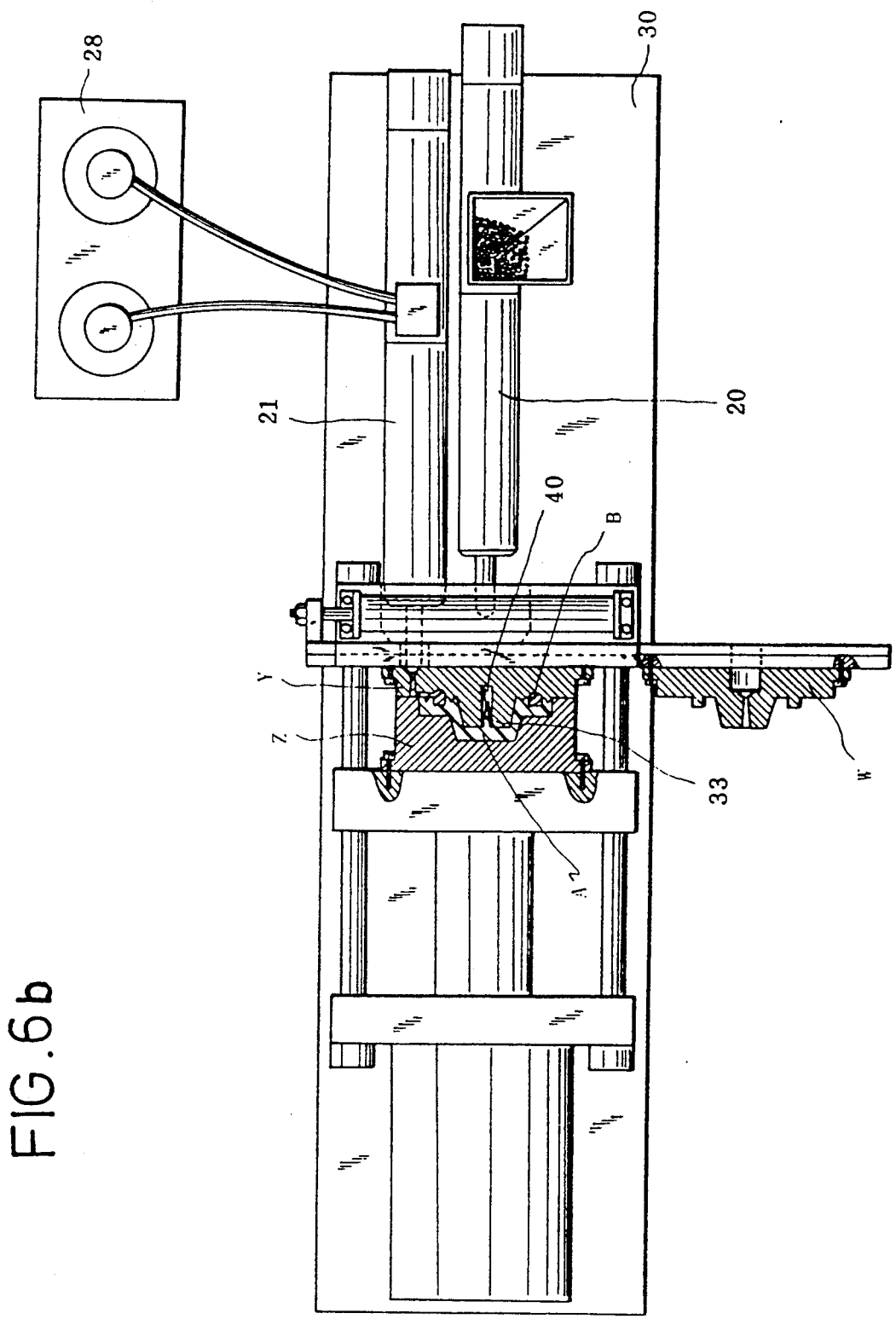

Next, the first molded body A left in the mold Z, as shown in FIG. 6(b), is closed and clamped to the mold Y moved with sliding of the slide board 25. As shown in FIG. 6(a), there are provided the projecting sections 6 around the cavity 7 for molding the second molded body, additionally the injection hole 11 for injecting a second resin such as silicon gum is connected to the cavity 7. There is provided a concave section 40 in approximately center of the mold Y. As shown in FIG. 6(b), the concave section 40 can accommodate a sprue 33 formed on the first molded body A during closing the molds Z and Y. Note that, the sprue 33 is the solidified first resin filled in a resin path 133 connecting the front end of the nozzle of the first injection device to the cavity for molding the first molded body.

The projecting sections 6 of the mold Y press the rim of the concave section of the first molded body A, to transform the concave section 13 into the concave section 3 whose sectional shape is an inverted-tapered shape. The second injection device 21 is advanced and a second resin such as silicon gum is injected into the concave section 3 and the cavity 7 to mold the second molded body B.

Silicon gum may be provided from a pot 31 of a seal supplyer 28 to the second injection device 21, and hardening agents may also be provided from a pot 32 thereof to the second injection device 21. Both are mixed in the second injection device 21 and injected into the concave section 3 and the cavity 7. The second resin injected is solidified in the concave section 3 and the cavity 7. The second resin is generally a thermosetting resin, so that cooling the second injection device 21 and heating the temperature of the mold Y about 120°–150° C. are capable of immediate solidification of the second resin in the concave section 3 and the cavity 7 without solidification in the second injection device 21. Within the above temperature range for the mold Y, such temperatures do not affect the choice of nylon-6 as a first thermoplastic resin, since the mold W for molding the first molded body A is preferably kept at a temperature of about 80°–90° C. to immediately solidify the first resin.

Figure 7A:
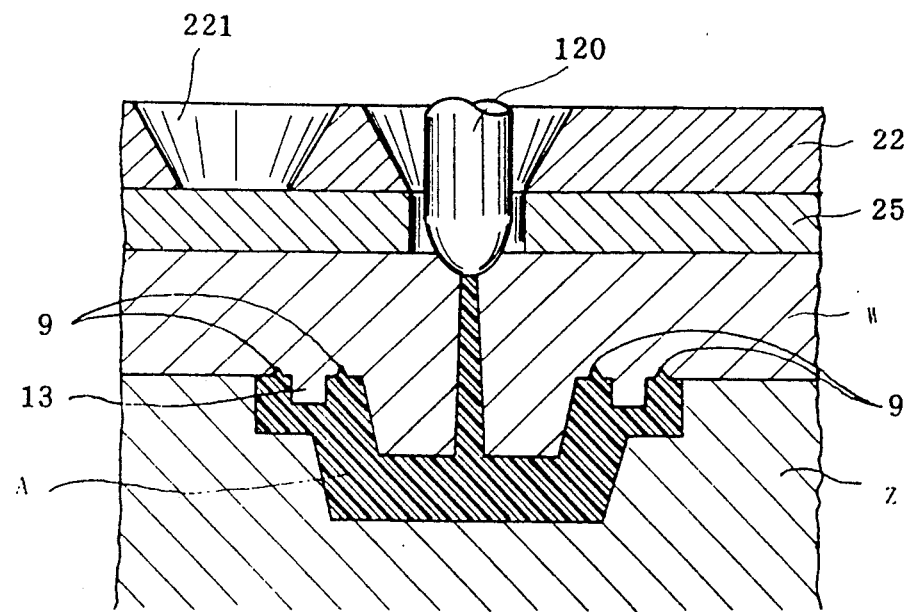

In the injection machine shown in FIG. 6(b), the rim of the concave section 13 of the first molded body A is pressed by the projecting section 6 of the mold Y, FIG. 7 shows another embodiment. The machine shown in FIG. 7 is, as same as the machine shown in FIG. 6, but in the machine, the mold Z and nozzles 120 and 121 can move horizontally during mold clamping and mold opening. Note that, their movement are shown as up and down in FIG. 7 but they can also move in a horizontal direction. As shown in FIG. 7(a), the first resin melt is injected into the cavity for molding the first molded body formed by the molds Z and W from the nozzle 120 of the first injection device 20, so that the projecting sections 9 and formed in the vicinity of the rim of the concave section 13 of the first molded body A.

Figure 7B:
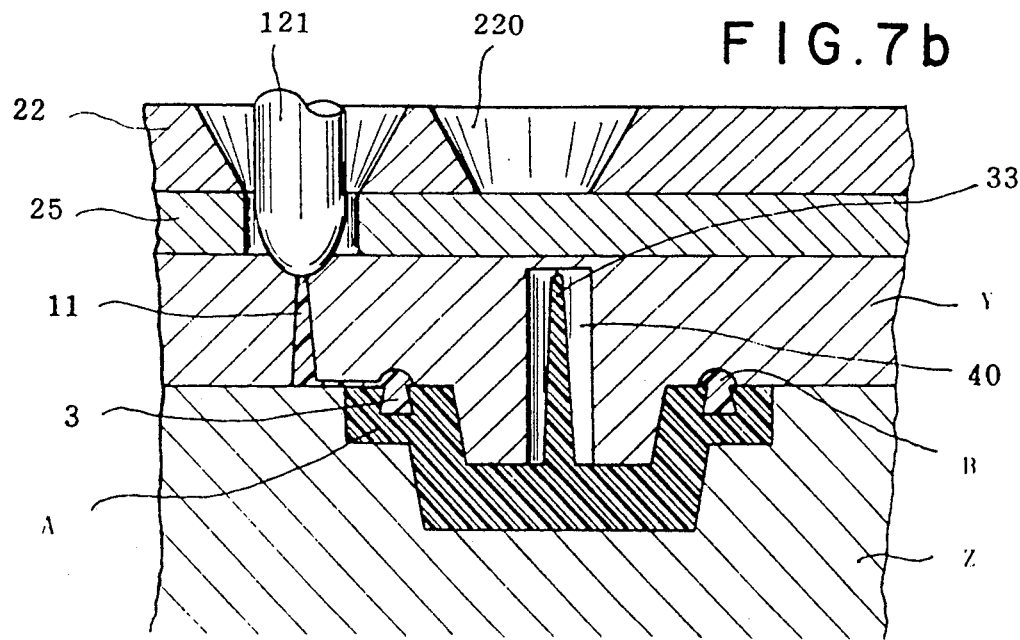
Figure 8:
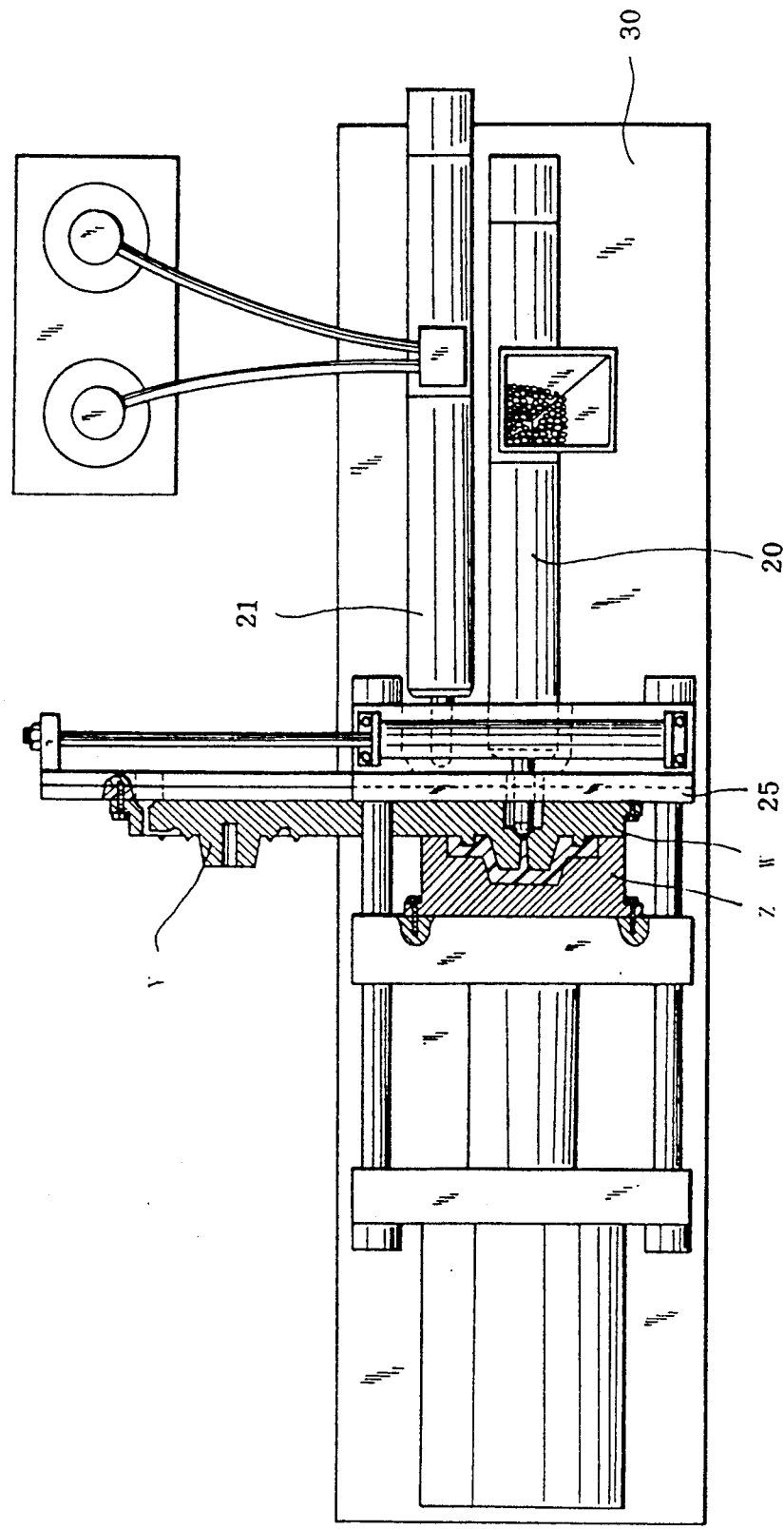

Next, after opening molds W and Z, the mold Z in which the first molded body A (having the projecting sections 9) has been left and the mold Y (which has moved by sliding the slide board 25) are clamped, so that the projecting sections 9 of the first molded body A are pressed by the bottom face of the mold Y. At such a point, the sectional shape of the concave section 13 is transformed into the inverted-tapered shape to form the concave section 3 having an undercut section. Then the second resin is injected into the concave section 3 and the cavity for molding the second molded body B. The second resin is injected via the nozzle 121 of the second injection device 21 and the injection hole 11 [FIG. 7(b)]. The mold Y has, as shown in FIG. 7(b), the concave section 40 accommodating the sprue 33 formed on the first molded body A, so that clamping the molds Z and Y can be executed without cutting the sprue 33.

In the machine shown in FIG. 6, the molds W and Y are respectively fixed with bolts on the slide board 25, the molds W and Y may, however, also be in one body, that single body also having a base connecting the two molds. Note that, the slide board 25 can be substituted a rotating verses sliding board. The rotary board 25 being rotated to travel the molds W and Y to a position for closing with and being clamped with the mold Z.

In the above described embodiments, both sides of the rim of the concave section 13 on the upper face of the first molded body A are pressed to transform the sectional shape. If at least one of walls of the concave section 13 is thin, it may be impossible to transform the sectional shape of the concave section 13 by pressing upon both sides of its rim. In that case, the following methods are adaptable.

Embodiments shown in FIGS. 9 and 10 are the case where one of the sides (numeral 50 in FIG. 9) of the concave section 13 is thin, so that area is unable to press upon the one of the sides thereof. In this case, it is possible to press the upper surface of the side 51 to form the undercut section in the concave section 31. In FIG. 10, the face 52, which contacts the thin side 50, is inclined to press the side toward the side 51, while the upper-surface of the side 51 is pressed by the projecting section 6 of the mold Y, so that the concave section 13 can be trans formed into an inverted-tapered shape.

Figure 11:
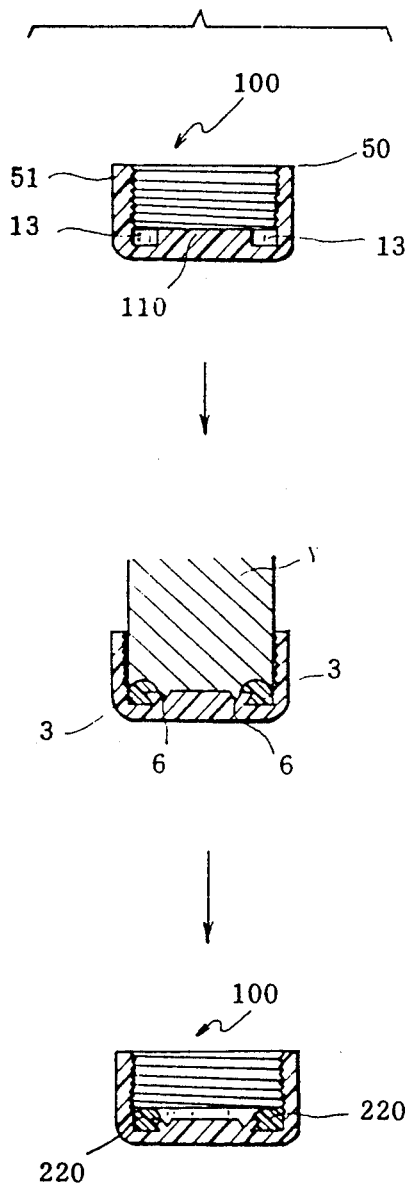
Figure 12:
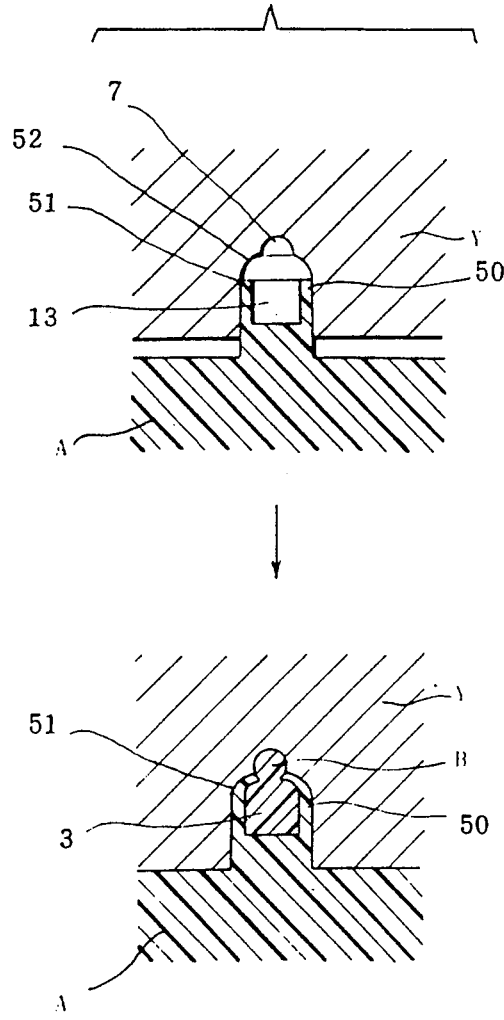

The method shown in FIG. 9 can be applied, as shown in FIG. 11, to mold a cap 100 having a seal 220 on the inner bottom face thereof. Namely, it is impossible to press the upper faces of thin sides 50 and 51 of the concave section 13 of the first molded body but it is possible to form the concave section 3 having the undercut section by pressing the upper-surface of one of sides 110 of the concave section 13. The method shown in FIG. 10 can also be applied, as shown in FIG. 12, to form the concave section 3 having the undercut section by pressing the upper sections of the sides 50 and 51 inward by a curved face 52 of the mold Y.

Figure 13:
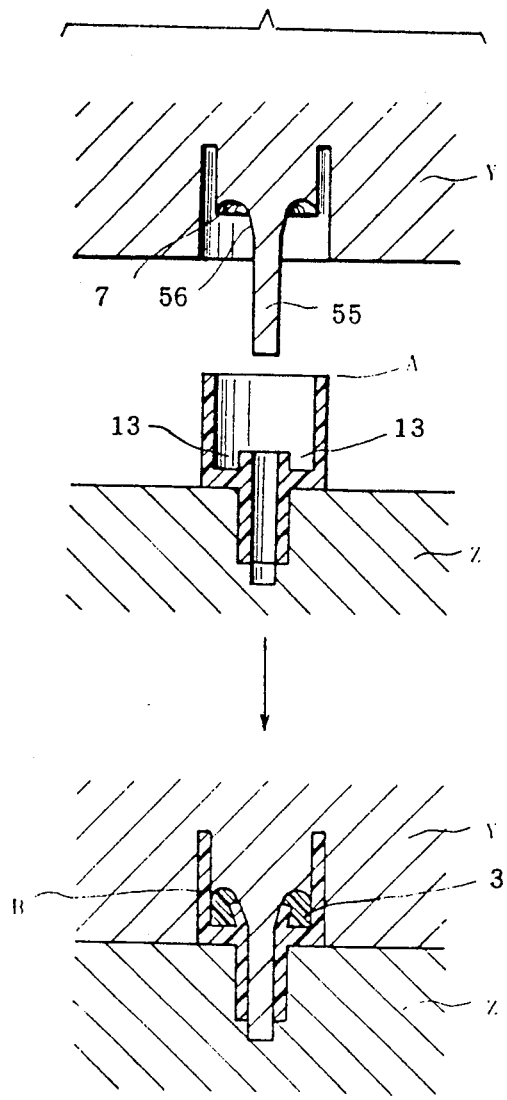
Figure 14:
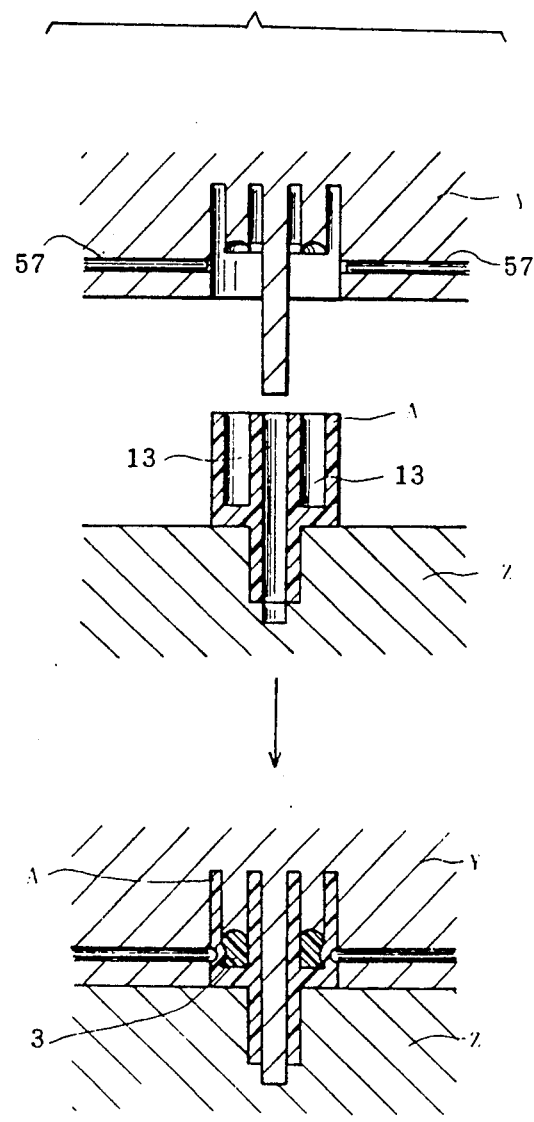

The embodiments shown in FIGS. 13 and 14 are methods for molding the second molded body B between an inner pipe and a outer pipe of a double pipe. If the part of the inner pipe can be transformed, as shown in FIG. 13, it is possible to form concave section 3 having the undercut section by transforming the part of the inner pipe outwards and therefore towards the inside of the concave section 13, by a tapered bottom section 56 of a rod-like projecting section 55 of the mold Y. And if it is impossible to transform the inner pipe, as shown in FIG. 13, it is possible to form the concave section 3 having an undercut section by transforming the exterior wall of the part of an outer pipe toward the inside of the concave section by a projecting pin 57 of the mold Y as shown in FIG. 14.

Figure 15:
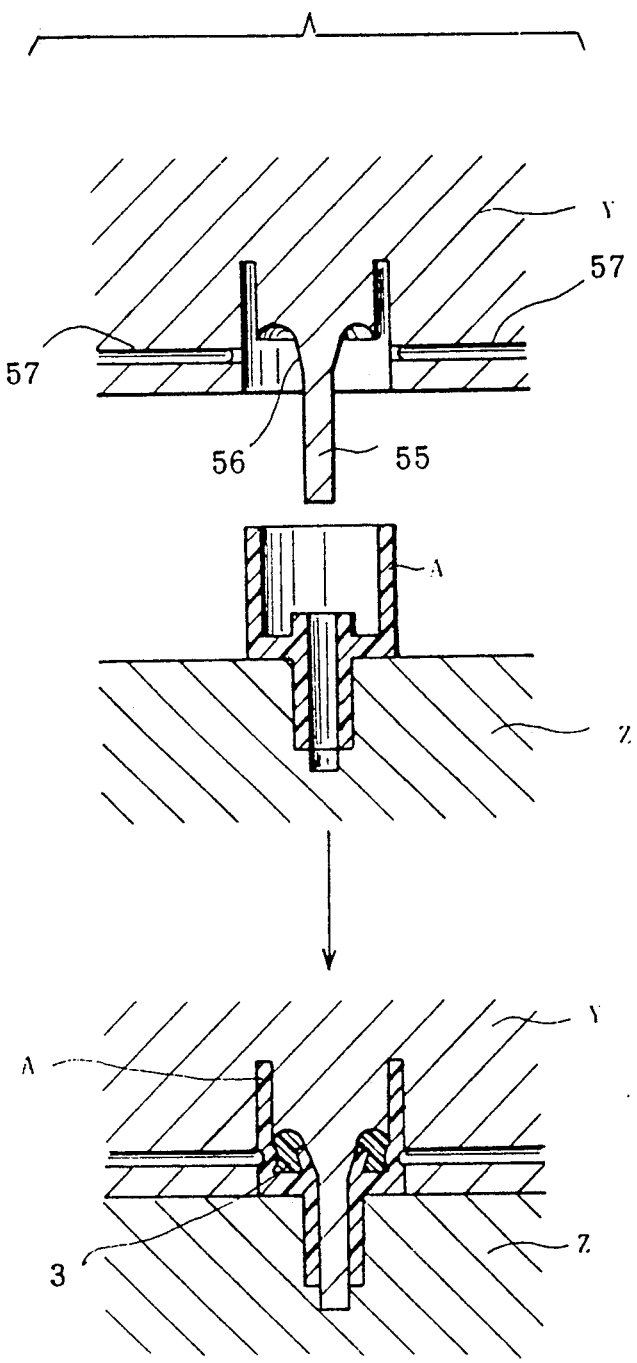

Furthermore, method combining the methods of FIGS. 13 and 14 is shown in FIG. 15. In this method, an undercut section can be formed in the concave section 3, and forming flashes can be prevented during molding the second molded body. Note that, in case of pressing at least one of sides of the concave section 13, it is allowable to press all part of rims or a part thereof.

Figure 16A:
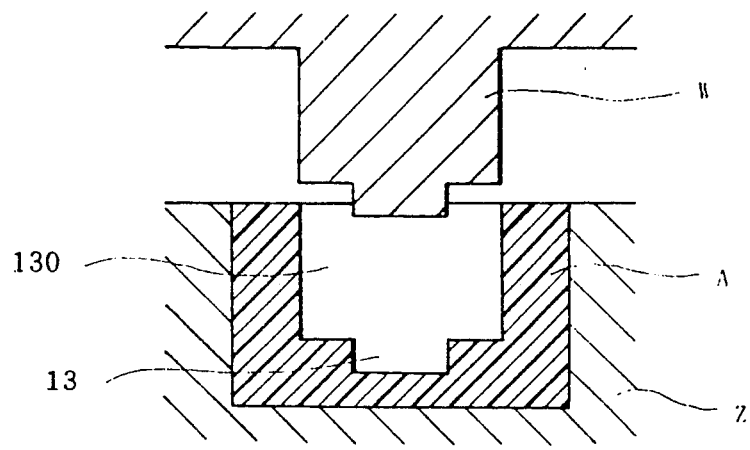
Figure 16B:
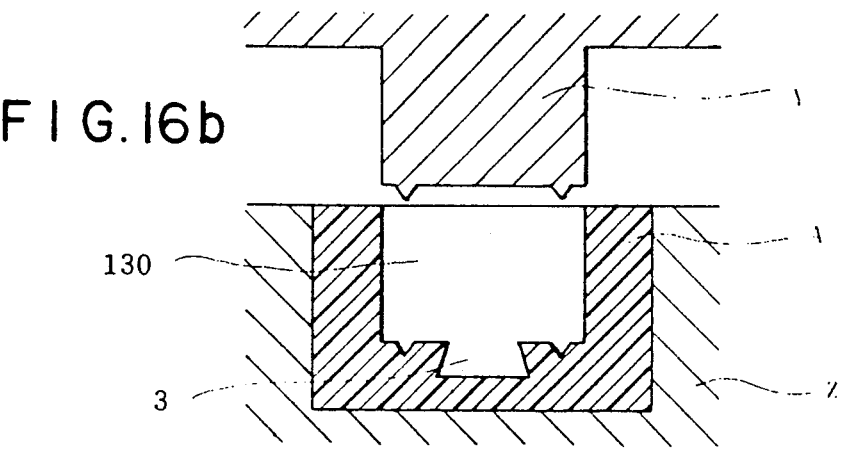
Figure 16C:
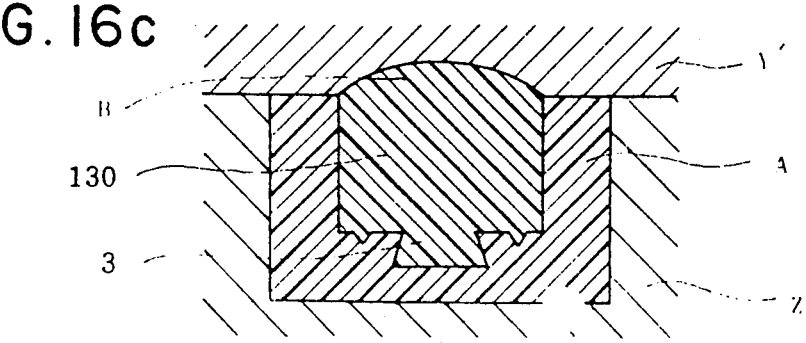

In an embodiment of the present invention as shown in FIG. 16, the concave section of the first molded body A consists of a wide groove 130 and a narrow groove 13 as a double groove. In this case, the resin for molding the second molded body is injected into the wide groove 130 and the concave section 3 after forming the concave section 3 having the undercut section by the rims of the narrow groove 13. This method can be achieved by providing the injection hole 11 (see FIG. 6) in a mold Y' apart from the mold Y. Namely, it means that an additional mold Y' having the injection hole 11 is provided besides the molds W, Y and Z. First, the first molded body A having the concave section like a double groove, as shown in FIG. 16(a) is molded with the molds W and Z. Next, as shown in FIG. 16(b), the undercut section is formed by pressing upon both sides of the rim of the narrow groove 13 of the first molded body A, which has been left in the mold Z, by the projecting sections 6 of the mold Y to project the side walls of the narrow groove 13 inward. Then the second resin is injected into the concave section and the cavity through an injection hole 11 of a mold Y', to mold the second molded body B as shown in FIG. 16(b) after the closing the molds Y' and Z, so that the first and second molded bodies A and B can be manufactured into one body.

In the above described embodiments, nylon-6 or another thermoplastic resin is used as the first resin for molding the first molded body A, and silicon gum or another thermosetting resin is used as the second resin for molding the second molded body B, since many kinds of resins are usable in the present invention. For example, polyester, polyvinyl chloride, polyethylene, polypropylene, etc. can be used as thermoplastic resins, and epoxy resin, unsaturated polyester, etc. can be used as thermosetting resins. Combinations of the first and second resins are not limited, however, to thermosetting resins and thermoplastic resins. For example, one may use different thermoplastic resins as both the first and second resin. Additionally, mutually non-compatible resins (e.g. polyester and polypropylen) can be used to mold the multi-injection molded bodies provided herein.

Figure 17:
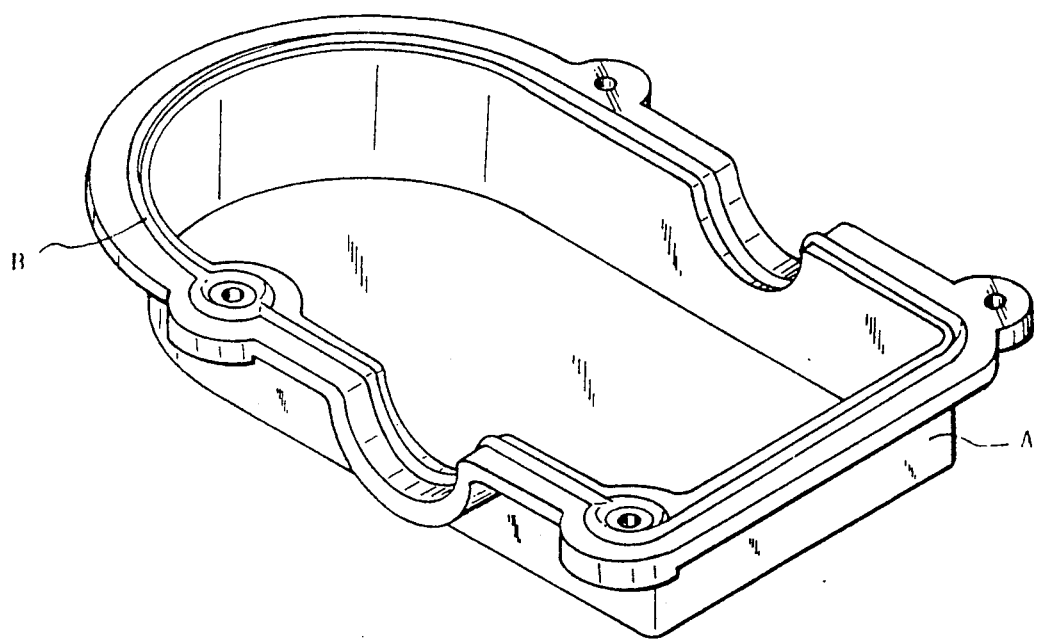
FIG. 17 shows a perspective view of another embodiment of a multi-injection molded body of the present invention.

In the present invention, it is possible to fix a sealing material as the second molded body B, such molded body B made of an elastic polymer tightly attached to a complex first molded body A as shown in FIG. 17 by injection molding. The second molded body B shown in the FIG. 17 may be used as a sealing material, an absorbing material or a nonskid material because of its elasticity.

Different and preferred kinds of elastic polymer, of course, can be used with regard to different types of anticipated uses.

In this embodiment (FIG. 17), the injection molding machine is a side stroke type whose movable board 24 moves in the horizontal direction, but the present invention can be applied to a vertical stroke type machine whose movable board moves in the vertical direction.

In the present invention, it is easy to mold a multi-injection molded body whose second molded body (e.g. sealing, absorbing or nonskid material, etc.) is tightly fixed to a complex shaped first molded body by injection molding while preventing the fomation of flashes. Therefore, the step of manually assembling the sealing material, etc. to the first molded body and the step of de-flashing can be reduced during the molding process.

What is claimed is:

1. An injected molded body consisting essentially of a first resin; the molded body having a concave section therein, the concave section having an opening which forms on a surface of the molded body, wherein the opening of said concave section forms a ring having an inner and outer fringe, the concave section having sidewalls wherein parts of the sidewalls of the concave section are projected inward to form undercut sections in the concave section, the concave section having a bottom; and the molded body having depressed push-marks, the push-marks being formed on a surface of said molded body continuously about the opening of said concave section, wherein a push-mark is formed along both the inner and outer fringes of the opening of said concave section, whereby the formation of the depressed push-marks projects parts of the sidewalls of said concave section inward, to give undercut sections in the concave section.

2. The injection molded body according to claim 1, wherein said depressed push-marks are a groove.

3. The injection molded body according to claim 2, wherein the transverse cross-sectional shape of said grooved push-marks are a wedge.

* * * * *